HEPBURN & PETERSON.
Machine for Grinding and Amalgamating Gold and Silver.
No. 1,827.
Reissued Nov. 29, 1864.
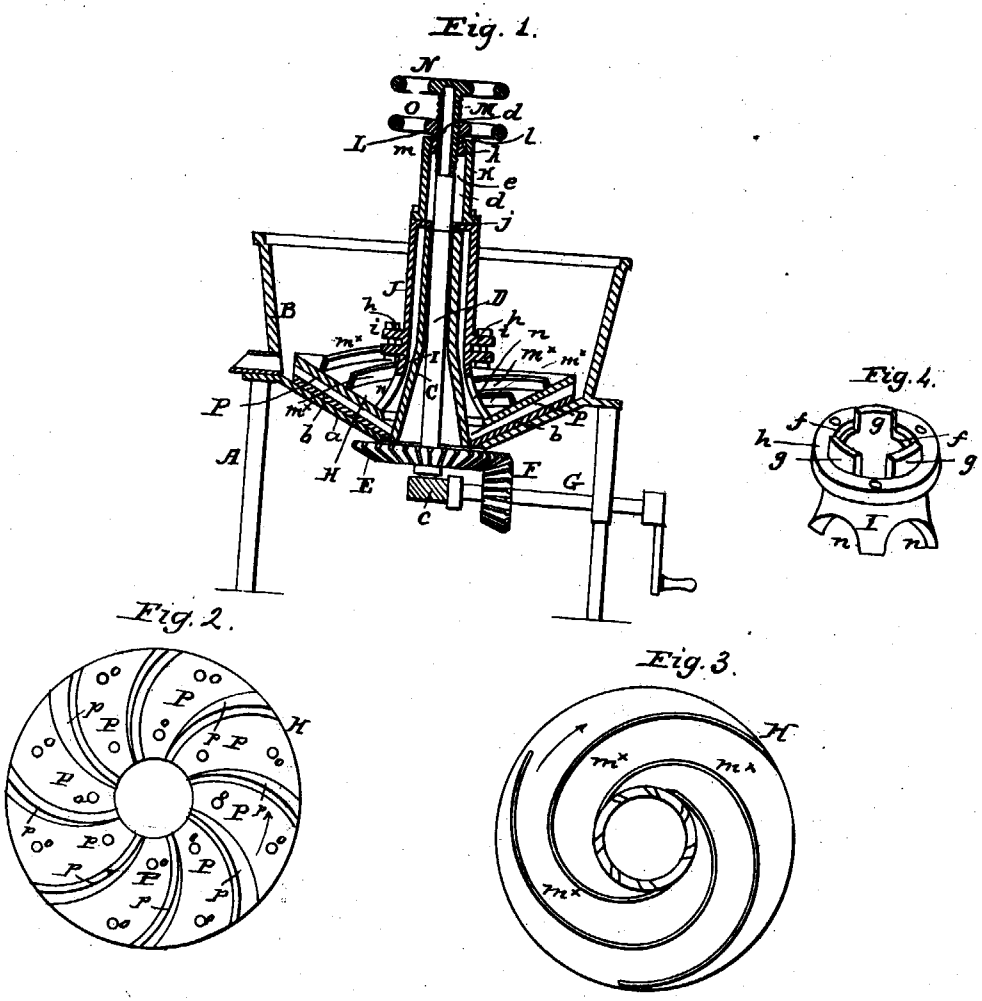
Witnesses:
J. W. Coombs
Geo. H. Reed
Inventors:
M. H. Hepburn
Geo. Peterson
per Munn & Co
Attorneys
N. PETERS, Photo-Lithographer, Washington, D. C.

UNITED STATES PATENT OFFICE.

WILLIAM H. HEPBURN AND GEORGE K. PETERSON, OF SAN FRANCISCO, CALIFORNIA.

IMPROVED MACHINE FOR GRINDING AND AMALGAMATING GOLD AND SILVER.

Specification forming parts of Letters Patent No. 42,371, dated April 19, 1864; Reissue No. 1,827, dated November 29, 1864.

*To all whom it may concern:*

Be it known that we, W. H. HEPBURN and G. K. PETERSON, of the city and county of San Francisco, and State of California, have invented a new and Improved Gold and Silver Amalgamator; and we do hereby declare that the following is a full, clear, and exact description of the same, reference being had to the accompanying drawings, making a part of the specification, in which—

Figure 1 is a vertical central section of our invention; Fig. 2, a bottom view of the muller; Fig. 3, a plan or top view of the same; Fig. 4, a detached perspective view of the joint or connection between the muller and the driving mechanism.

Similar letters of reference indicate corresponding parts in the several figures.

This invention consists in the employment or use of a pan provided with a concave bottom, whether rounded, conical, or other convenient form, and a shell-form muller corresponding in shape with the bottom of the pan, so constructed and arranged as to operate in such a manner that all the pulp or pulverized ore will be brought in contact with the quicksilver in the pan and all the particles of gold or silver perfectly amalgamated.

To enable those skilled in the art to fully understand and construct our invention, we will proceed to describe it.

A represents a frame on which a pan, B, is placed, having a concave bottom, *a*, whether of a rounded, conical, or other suitable form, on the upper surface of which iron plates *b* are bolted or secured in such a manner that they may be removed at any time when worn by use and replaced by new ones.

C represents an upright tube, which is connected centrally with the bottom *a* of the pan, and projects upward a suitable distance. Through this tube C a vertical shaft, D, passes, the lower end of said shaft being stepped in a bar, C, of a frame secured to the under side of the pan B, and having a bevel-wheel, E, upon it, which gears into a pinion, F, on a horizontal driving-shaft, G. The shaft D extends a considerable distance above the upper end of the tube C, and is square for a short distance, as shown at *d*, and cylindrical the remaining distance, as shown at *d'*, but smaller in diameter, so as to form a shoulder, *e*, on the shaft D, as shown plainly in Fig. 1.

H represents a muller, which is an iron shell corresponding in shape to the bottom of the pan, as shown in Fig. 1. This muller has an upright hollow hub, I, at its center, the upper end of which has notches *f* made radially into it, as shown plainly in Fig. 4, and on the upper end of the hub I there is fitted a hollow cylinder, J, the lower end of which is notched like the upper end of I, so that the notches *f* of the hub I will receive the projections between the notches at the lower end of J, and the notches at the lower end of J receive the projections *g* between the notches *f* of I. The upper part of the hub I is provided with a flange, *h*, as is also the lower part of cylinder J. Through these flanges bolts *i* pass, as shown in Fig. 1. The upper end of the cylinder J rests on the upper end of the tube C, when the muller is lowered to its fullest extent, and in the upper end of the cylinder J a square hole, *j*, is made for the square portion *d* of the shaft D to pass through. By this means the muller H is rotated from the shaft D.

On the upper end of cylinder, J, there is secured a cylinder, K, in the upper end of which a thimble, L, is fitted and allowed to turn freely, the lower end of said thimble being provided with a flange, *k*, which is fitted under a lip, *l*, at the upper end of the cylinder K. This thimble L is provided with an internal screw, *m*, into which a tubular screw, M, is fitted, having a hand-wheel, N, upon it, the upper cylindrical part, *d'*, of the shaft D fitting in the tubular-screw M. On the upper end of the thimble L a hand-wheel, O, is secured.

On the upper surface of the muller H there are a number of spiral flanges or ribs, $m^{\times}$, which are shown clearly in Fig. 3, said flanges or ribs extending from the periphery of the muller to the hub I, which has openings *n* made in it.

To the under side of the muller H there are attached by bolts O a series of shoes, P, of curved form, the edges of which are beveled, so as to form oblique grooves *p*, a space being allowed between the shoes in order to form said grooves, which are curved or spiral form, as shown clearly in Fig. 2. The direction of these curved grooves *p* from the hub to the periphery of the muller is the reverse of the rotation of muller, which is indicated by the arrows in Figs. 2 and 3.

Operation: The pulp and quicksilver are placed in the pan B, and the muller rotated by shaft D by any convenient power. The pulp or ore is made to pass from the periphery of the muller H toward its center by means of its concave upper surface, the pulp or ore passing through the hub and openings in muller between the shoes P on the bottom of the muller and the top of plates *b* on the bottom of the pan, and is forced by the grooves *p* (acting by their curved or spiral form and their direction the reverse of the volation of the muller as force-pumps) toward the periphery of the muller, and over again upon the upper surface, is worked over and over again until all the pulp is reduced, and particles of metal amalgamated with the quicksilver, the shoes P being grinding-surfaces and causing the pulp or ore and quicksilver to be thoroughly incorporated with each other.

If desired, the spiral flanges or ribs may be attached to the top of the muller for purpose of agitating the pulp in its descent to the center, but they are not essential to the proper working of the machine.

The concave form of the muller and bottom of the pin gives the ore and quicksilver a gravitating tendency toward the center of the pan and muller, thereby counteracting centrifugal force and insuring a regular and constant flow of the pulp or ore and quicksilver toward the periphery of the muller and back toward its center.

The muller H is raised and lowered so as to have its shoes P run or work as close to the plates *b* on the bottom *a* as may be desired by turning either the tubular screw M or the thimble L. When it is desired to raise the muller, the wheel O of the thimble L, when the muller is in motion, is held with one hand while the wheel N of the tubular-screw M is turned in the direction in which the muller is rotated. When it is desired to lower the muller, the wheel N of the tubular-screw is held with one hand while the wheel O of the thimble L is turned in the direction of the rotation of the muller H.

Having thus described our invention, we disclaim as our own the concave bottom of pans.

What we claim as new, and desire to secure by Letters Patent, is—

1. The pan B, with concave bottom, in combination with a corresponding-shaped muller, in shell form, having openings in the hub and shell sufficient to allow the pulp to pass freely to the grinding-surfaces arranged with or without the ribs $m^{\times}$, substantially as described, and for the purpose set forth.

2. The arrangement of the shoes P, provided with curved beveled edges and attached to the under side of the muller H, so as to form oblique or spiral curved grooves *p* in reverse direction to rotation of muller, for the purpose specified.

3. The spiral flanges or ribs $m^{\times}$ on the upper side of the muller, as described.

4. The arrangement of the hand-wheels O N, thimble L, and tubular screw M, substantially as described, and for the uses and purposes as hereinbefore set forth.

WM. H. HEPBURN,
GEO. K. PETERSON.

Witnesses:
CHAS. R. BOND,
OTIS V. SAWYER.